United States Patent

Benhase et al.

[11] Patent Number: 5,857,213
[45] Date of Patent: Jan. 5, 1999

[54] METHOD FOR EXTRACTION OF A VARIABLE LENGTH RECORD FROM FIXED LENGTH SECTORS ON A DISK DRIVE AND FOR REBLOCKING REMAINING RECORDS IN A DISK TRACK

[75] Inventors: Michael T. Benhase, Tucson, Ariz.; James Thomas Brady; Damon W. Finney, both of San Jose, Calif.; Michael Howard Hartung, Tucson, Ariz.; Michael Anthony Ko, San Jose, Calif.; Donald J. Lang, Cupertino, Calif.; Jaishankar Moothedath Menon, San Jose, Calif.

[73] Assignee: International Business Machines Corporation, Armonk, N.Y.

[21] Appl. No.: 761,639

[22] Filed: Dec. 6, 1996

[51] Int. Cl.⁶ ..................................................... G06F 12/02
[52] U.S. Cl. ........................... 711/112; 711/153; 711/159; 711/165; 711/170; 711/173; 711/113
[58] Field of Search .................................. 711/112, 113, 711/153, 159, 165, 170, 171, 172, 173; 369/53

[56] References Cited

U.S. PATENT DOCUMENTS

| | | | |
|---|---|---|---|
| 4,775,969 | 10/1988 | Osterlund | 369/53 |
| 5,034,914 | 7/1991 | Osterlund | 395/872 |
| 5,091,909 | 2/1992 | Kishiro et al. | 371/40.14 |
| 5,119,291 | 6/1992 | Flannagan et al. | |
| 5,162,908 | 11/1992 | Kim | |
| 5,233,702 | 8/1993 | Emma et al. | |
| 5,237,675 | 8/1993 | Hannon, Jr. | |
| 5,257,369 | 10/1993 | Skeen et al. | |
| 5,260,781 | 11/1993 | Soloff et al. | |
| 5,325,492 | 6/1994 | Bonevento et al. | |
| 5,394,534 | 2/1995 | Kulakowski et al. | |
| 5,475,540 | 12/1995 | Gold | 360/48 |
| 5,517,631 | 5/1996 | Machado et al. | 711/111 |
| 5,568,628 | 10/1996 | Satoh et al. | 711/113 |

*Primary Examiner*—Tod R. Swann
*Assistant Examiner*—J. Peikari
*Attorney, Agent, or Firm*—Ohlandt, Greeley, Ruggiero, & Perle

[57] ABSTRACT

A method enables a host processor, which employs variable length (VL) records, to communicate with disk storage which employs fixed length (FL) sectors for storage of the VL records. The method comprises the steps of: a) deriving a first control data structure for an update VL record, the first control data structure including information describing segments of the update VL record; b) determining a disk track that includes a FL sector wherein am old VL record commences that corresponds to the update VL record; c) reading each FL sector in the disk track and creating a control data structure which includes information describing each VL record stored in the disk track; d) substituting in a control data structure for the old VL record that corresponds to the update VL record, information regarding update data from the first control data structure; e) recording in the disk track, data indicated by each control data structure determined in steps c) and d); and f) if the old VL record ends at other than a sector break of a FL sector, reblocking VL records into FL sectors which are recorded thereafter on the disk track. The invention also enables a read action to be accomplished in one rotation of a disk even though it commences at a FL sector that is not at the beginning of a VL record to be accessed.

10 Claims, 7 Drawing Sheets

FIG. 6A.
TRACK READ & UPDATE

FIG. 6B.

SPLIT READ

FIG. 7.

METHOD FOR EXTRACTION OF A VARIABLE LENGTH RECORD FROM FIXED LENGTH SECTORS ON A DISK DRIVE AND FOR REBLOCKING REMAINING RECORDS IN A DISK TRACK

FIELD OF THE INVENTION

This invention relates to a method for handling communications of variable length records from a host processor to a disk drive which stores the variable length records in the form of fixed length sectors and, more particularly, to such a method which enables interface circuitry between the disk drive and host processor to handle data transfers therebetween in such a manner that the data format differences are transparent to the communicating devices.

BACKGROUND OF THE INVENTION

Currently, arrays of small disk drives are used as main storage facilities for mainframe host processors. Such small disk drives employ resident microprocessors which restrict reads and writes to fixed block/sector sizes. Such drives are further configured to handle data records and/or logical tracks that are spread across plural drives (with parity) to enable data recovery in the event of the malfunction of one or more disk drives.

Host processors generally employ a variable length record configuration when communicating with disk memory. For instance, many host processors configure their data in the form of count, key and data fields, with the count field being of a fixed length and the key and data fields being of variable length. To write a variable length field into a fixed length sector on a disk drive requires that the microprocessor associated with the disk drive segment the variable length record into fixed length sector sizes. Further, provision is made to enable a variable length record to start or end at other than a sector break, to enable an efficient use of disk storage space.

For efficient transfers of data to occur between a host processor and a plurality of small disk drives, it is preferable that each disk drive look to the host processor as though it is employing variable length records, and that the host processor look to each disk drive as though it is employing fixed length sector formats. In accomplishing such a transparency, a number of further requirements are placed upon the interface circuitry. For instance, accomplishment of transparency must not exact a substantial penalty in data throughput rate; must enable efficient use of the disk space; must enable accommodation of altered record sizes, and preferably, be able to extract small amounts of data from large blocks of data (e.g., full track).

Accordingly, it is an object of this invention to provide an improved method for transfer of variable length records from a host processor to a disk drive which stores data in fixed length sectors.

It is another object of this invention to provide a method of data transfer which enables compressed data to be handled and accommodated in a disk drive's fixed length sectors.

It is yet another object of this invention to provide a method of data transfer which enables a variable length record input data stream to be reblocked for storage in fixed length sectors on disk, using a minimum amount of disk capacity.

It is still another object of this invention to enable a disk, having fixed length sectors, to transfer data from any point in a track, without requiring such a transfer to begin at the commencement of the track.

SUMMARY OF THE INVENTION

A method enables a host processor, which employs variable length (VL) records, to communicate with disk storage which employs fixed length (FL) sectors for storage of the VL records. The method comprises the steps of: a) deriving a first control data structure for an update VL record, the first control data structure including information describing segments of the update VL record; b) determining a disk track that includes a FL sector wherein am old VL record commences that corresponds to the update VL record; c) reading each FL sector in the disk track and creating a control data structure which includes information describing each VL record stored in the disk track; d) substituting in a control data structure for the old VL record that corresponds to the update VL record, information regarding update data from the first control data structure; e) recording in the disk track, data indicated by each control data structure determined in steps c) and d); and f) if the old VL record ends at other than a sector break of a FL sector, reblocking VL records into FL sectors which are recorded thereafter on the disk track.

DETAILED DESCRIPTION OF THE INVENTION

Figure 1:
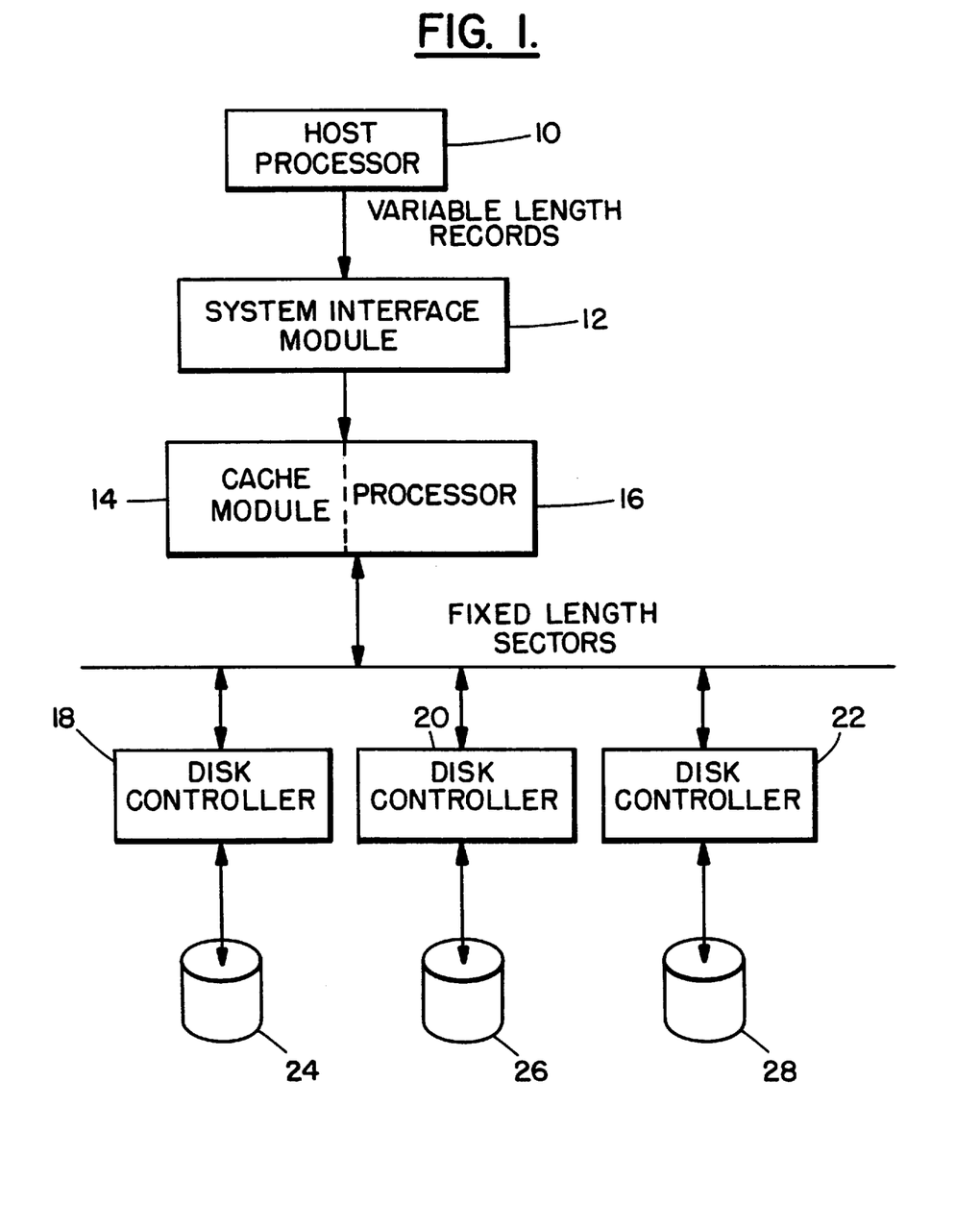
FIG. 1 is a block diagram of a system incorporating the invention.

Host processor 10 configures data to be stored to disk into a variable length (VL) record format and transmits each VL record to a system interface module 12. Prior to receipt of the VL record, system interface module 12 establishes a control data block. Upon receipt of the VL record, the control data block is "filled in" with data which fully defines the structure of the received VL record. As the VL record is received, segments thereof are buffered in a cache module 14, and at the same time, entries regarding the structure of the VL record and the location in cache module 14 where various portions thereof are buffered, are noted in the control data block.

Thus, system interface module 12 prepares an initial control data structure that defines the structure of the VL record and further includes pointers to additional control data blocks which indicate where in cache module 14, various portions of the received VL record are buffered.

After the buffering action is complete, a processor 16 within cache module 14 commences an update procedure and provides commands to one or more disk controllers 18, 20, 22, etc. to access a disk track in a connected disk drive 24, 26, 28, etc. wherein a fixed length sector is stored which corresponds to the received VL record. The software which controls processor 16 and enables execution of the invention hereof, may be loaded from a magnetic disk or other suitable source of operating code.

As will be hereafter understood, processor 16, via a disk controller, can access those fixed length sectors directly involved with a received VL record or may access all sectors from a track. In either case, as sectors are read from a disk drive track, a control data structure is created for each record which defines its structure and location in buffer store. The data read from one or more disk drives 24, 26, 28, etc. are buffered in cache module 14.

Next, under control of processor 16, the contents of the record read from disk which corresponds to the received VL record from host processor 10 is updated with data from the VL record. Thereafter, a write action occurs wherein either just the updated fixed length sectors are rewritten to disk, including pad data if the data is compressed and the length of the data section of the record has therefore decreased, or the entire track is rewritten to disk and the records following the record which has been updated are resegmented in accordance with subsequent fixed length sector structures. Note that disk controllers 18, 20 and 22 only have the capability to read and/or write a full fixed length sector from disk.

Figure 2:
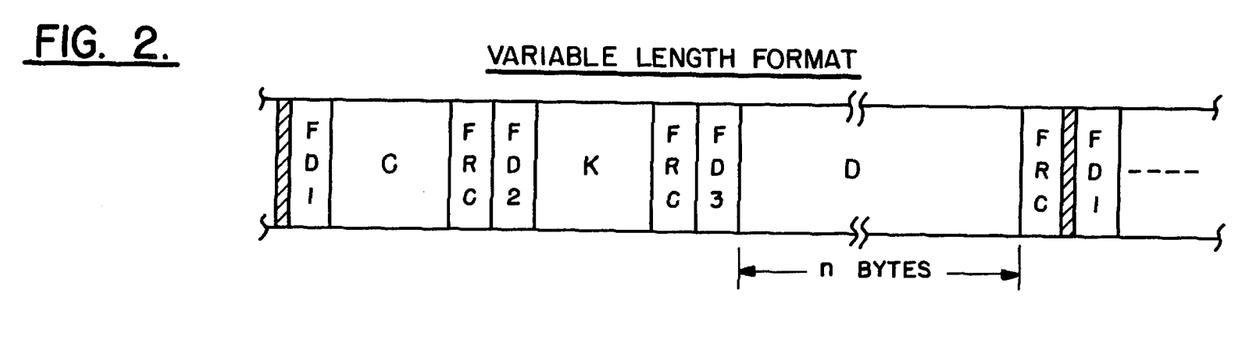
FIG. 2 is a schematic showing of the format of a variable length record, as transmitted from and received by the host processor in FIG. 1.

Prior to describing the detailed operation of the system of FIG. 1, both the fixed length sector format and the VL record format will be described. Referring to FIG. 2, the VL record format is illustrated and comprises three main fields, a count (C) field, a key (K) field, and a data (D) field. Each field is preceded by a field descriptor (i.e., FD1, FD2, FD3 respectively), which includes certain data regarding the immediately following field. The VL record format shown in FIG. 2 is well known in the prior art as the CKD format.

The count field contains, among others, the address of the record in the form CCHHR (CC=cylinder number, HH=head number, R=record number) and the length of the data field. The key field contains the record's key and may be of variable length. The key field is a name ascribed to the record which may be searched, rather than the record number. The data field is of variable length and includes all of the data associated with the particular record. Immediately after each of the count, key and data fields is a field redundancy check (FRC) character which is used for error checking.

Figure 3:
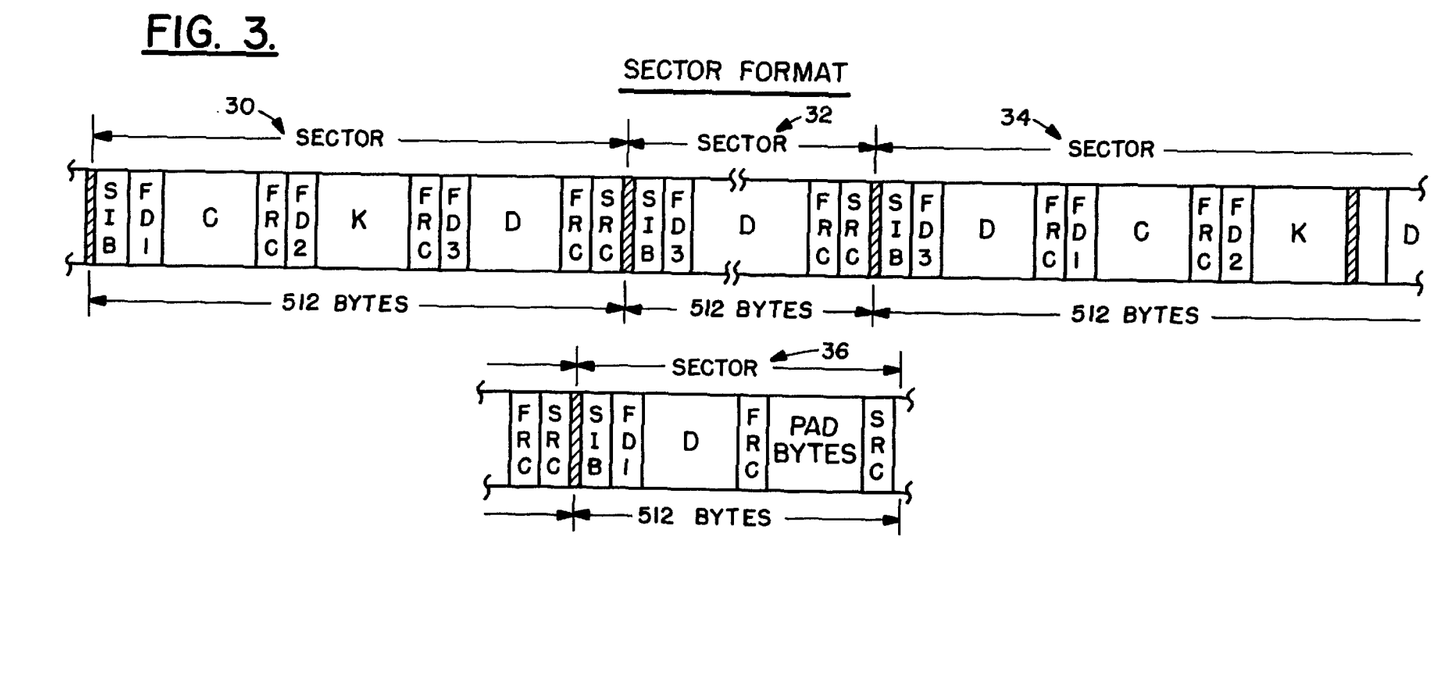
FIG. 3 is a schematic showing of fixed length sector format data which is read from and written to the disk drive shown in FIG. 1.

Referring to FIG. 3, the fixed length (FL) sector format found on each of disks 24, 26 and 28 is illustrated. Each FL sector is of an identical length in bytes and may store a portion of a VL record, a full VL record, or multiple VL records, depending on the length of each VL record. Each FL sector commences with a sector information block (SIB) which includes data identifying the particular FL sector. A FL sector number can be calculated, knowing the common length of each FL sector and the number of FL sectors in a track. After the SIB, comes a field descriptor (e.g., FD1) which describes the record field that immediately follows.

For example, in sector 30, a complete CKD VL record is present and FD1 describes the field fragment that immediately follows it. The description includes field type, status and length of the field. Immediately after FD1 is a count field which includes the record number of the variable length record data which follows. A field redundancy check (FRC) character follows the count field and, is in turn, followed by a FD2 field which defines the subsequent key field. Thereafter, a further redundancy check field and an FD3 field descriptor for field 3 are found, with FD3 describing the type and length of the immediately following data field.

Note that, as an example, each FL sector in FIG. 3 is shown to comprise 512 bytes, with each FL sector ending with a field redundancy check field and a sector redundancy check field. Since, however, the data field of the first record is longer than the space available in FL sector 30, the data field extends over into FL sector 32 and is preceded by an FD3 descriptor which describes the length of the data field in FL sector 32. In the example of FIG. 3, the data field extends further than the limits of FL sector 32 and into sector 34. There, the data field terminates and is immediately followed by the beginning of the next VL record and an FD1 descriptor which defines the immediately succeeding count field, etc.

Notice that the data field in FL sector 34 extends over and into FL sector 36, but terminates prior to the end of FL sector 36. Rather than a new VL record commencing within sector 36, a plurality of pad bytes immediately follow the end of the data field of the previous VL record and fill out the remainder of FL sector 36. The pad bytes are inserted to fill out the length in a FL sector (or sectors) wherein data has been updated and rewritten, but now occupies less than the number of bytes occupied by the original data of the VL record. The pad bytes fill out the unoccupied remainder of the FL sector.

Pad bytes are used when a "home area sector extract" read/write technique is used by the invention. More specifically, rather than reading a full track to obtain a VL record to be updated, only the FL sectors including the VL record to be updated are read; updated and then rewritten to disk, with pad bytes being included at the end of the data to fill in any unused portion of a FL sector or sectors at the end of the VL record. In such manner, VL records which follow do not need to be reformatted or "reblocked" across the succeeding FL sectors. Pad bytes are not required if the entire track is read; the VL record of interest updated; and the entire track rewritten, with VL records succeeding the updated VL record being automatically reblocked.

The control data structures which enable operation of the invention will hereafter be described. Data processing systems include many different types of control data blocks to enable a functioning of the various data processing actions. The control data blocks to be described hereinbelow are just those necessary to enable operation of the invention. When data is read from a track of a disk, a track descriptor vector (TDV) table is constructed which fully describes each VL record contained within the associated track. A TDV includes a track descriptor vector element (TDVE) which is a control block that describes a record contained within a track. Thus, each TDV includes plural TDVE's, each TDVE defining a logical VL record contained within the track. Obviously, if there is only one VL record in the track, the TDV includes only a single TDVE.

It is to be understood that a TDV is constructed when data is read from disk into cache module 14 so as to fully describe the data from the track and to enable any portion thereof to be located, modified, and rewritten to the same or another track.

As described above, a TDV table contains a separate TDVE entry for each record. While a TDVE data structure can include many entries, the entries that are pertinent to this invention are indicated immediately below:

TRACK DESCRIPTOR VECTOR ELEMENT (TDVE)
    FIELD 1 DATA (COUNT)
    FIELD 2 LENGTH (e.g. KEY)
    FIELD 3 LENGTH (e.g. DATA)
    FLAGS:
        MULTIPLE SECTIONS IN TDVE
        STARTS ON SECTOR BREAK
    FIRST BCB
    LAST SECTOR BREAK BCB
    PAD LENGTH Assuming that VL records on a disk track are arranged using the known "count, key, data" format, the above-noted TDVE data structure includes field descriptors for each of the count, key and data fields. Field 1 (the entire count field) includes the actual record number, whereas the field 2 and 3 values include pointers to further control structures which indicate where the key and data portions of the record are buffered. As will be described below, those further control structures are buffer control blocks (BCBs).

The field 2 length includes the length of the record's key field and the field 3 value indicates the length of the data in the data portion of the VL record and the type of the field. The flags included in a TDVE indicate whether multiple FL sectors are present in the TDVE and whether the VL record starts on a sector break (i.e., starts at the beginning of a FL sector).

A TDVE further includes a pointer to a first BCB which is a data structure that includes control data to enable set up and identification of physical buffer space that is employed in the storage of the record defined by the TDVE. As will hereafter be understood, BCB's can be chained, one from the other so that only the first BCB need be indicated in a TDVE.

A TDVE further includes a pointer to a BCB which points to the buffer storing the last segment of data in the last FL sector which stores the VL record. Further, the TDVE indicates a pad length at the end of the VL record (if any) and the VL record number.

A BCB data structure is shown below:
BUFFER CONTROL BLOCK
    NEXT BCB POINTER
    DATA BYTES IN BUFFER
    BUFFER SIZE
    BUFFER ADDRESS Each BCB data structure includes a pointer to a next BCB (if any), it being realized that plural buffer locations may be allocated to a data caching action. Each BCB further includes an entry "data bytes in buffer" which indicates the number of data bytes stored in the physical buffer space. The "buffer size" entry indicates the total size of the associated buffer and the "buffer address" indicates the address of the area in cache memory wherein the actual data is stored which corresponds to the BCB control structure.

Figure 4:
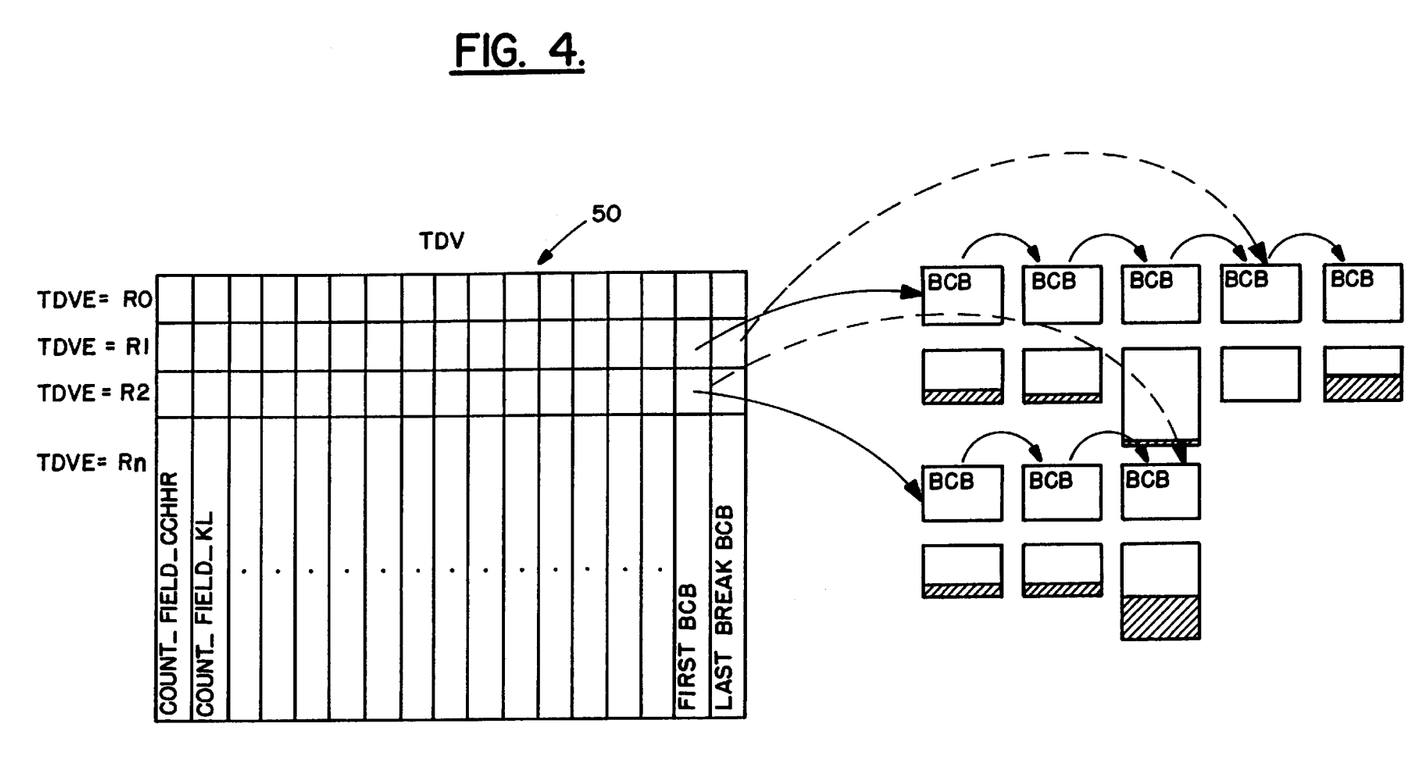
FIG. 4 is a schematic indication of a track descriptor vector (TDV) table showing entries therein and their relationship to other control data blocks and associated buffer storage areas.

Referring now to FIG. 4, the relationship between a TDV, TDVE and various BCB's is illustrated. TDV 50 defines all the VL records in a track, from record R0 to record Rn. Each row in TDV 50 corresponds to a TDVE which, in turn, corresponds to a specific VL record number contained in the track. The "first BCB" entry in a TDVE points to a first BCB that, in turn, provides information regarding where in cache memory 14 the associated data is stored. As indicated above, BCB's can be chained so as to enable data from a VL record to be positioned at various locations in the cache. The "last sector break BCB" entry in a TDVE points to the BCB which, in turn, points to the area of cache which contains the data from the FL sector that stores a last portion of a FL record. More specifically, the "last sector break BCB" points to data which, when stored in a FL sector, starts on a sector boundary.

Figure 5A:
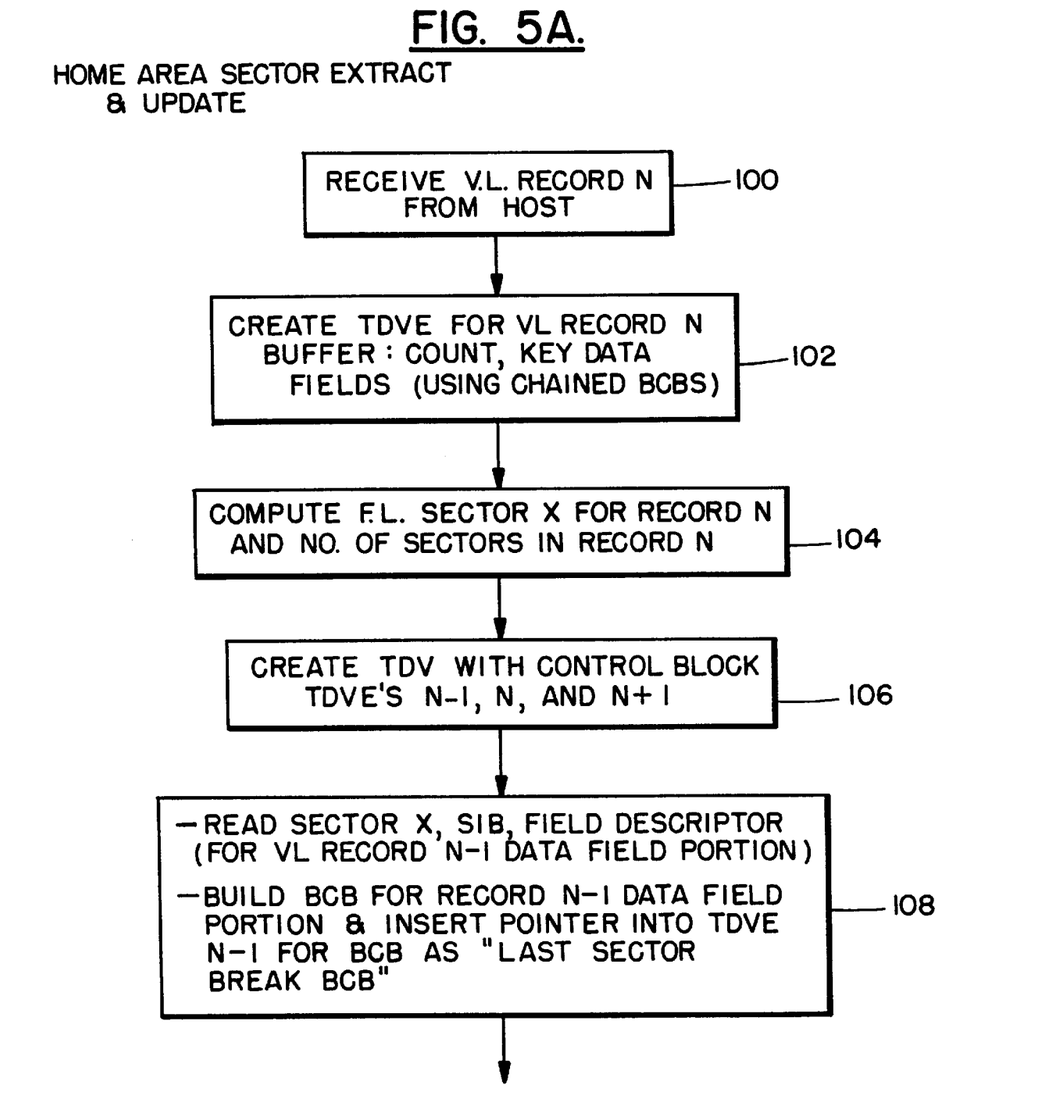
FIGS. 5A and 5B comprise a logic flow diagram illustrating the manner of extraction of sector format data and the revision thereof in accordance with variable length data received from a host processor.
Figure 5B:
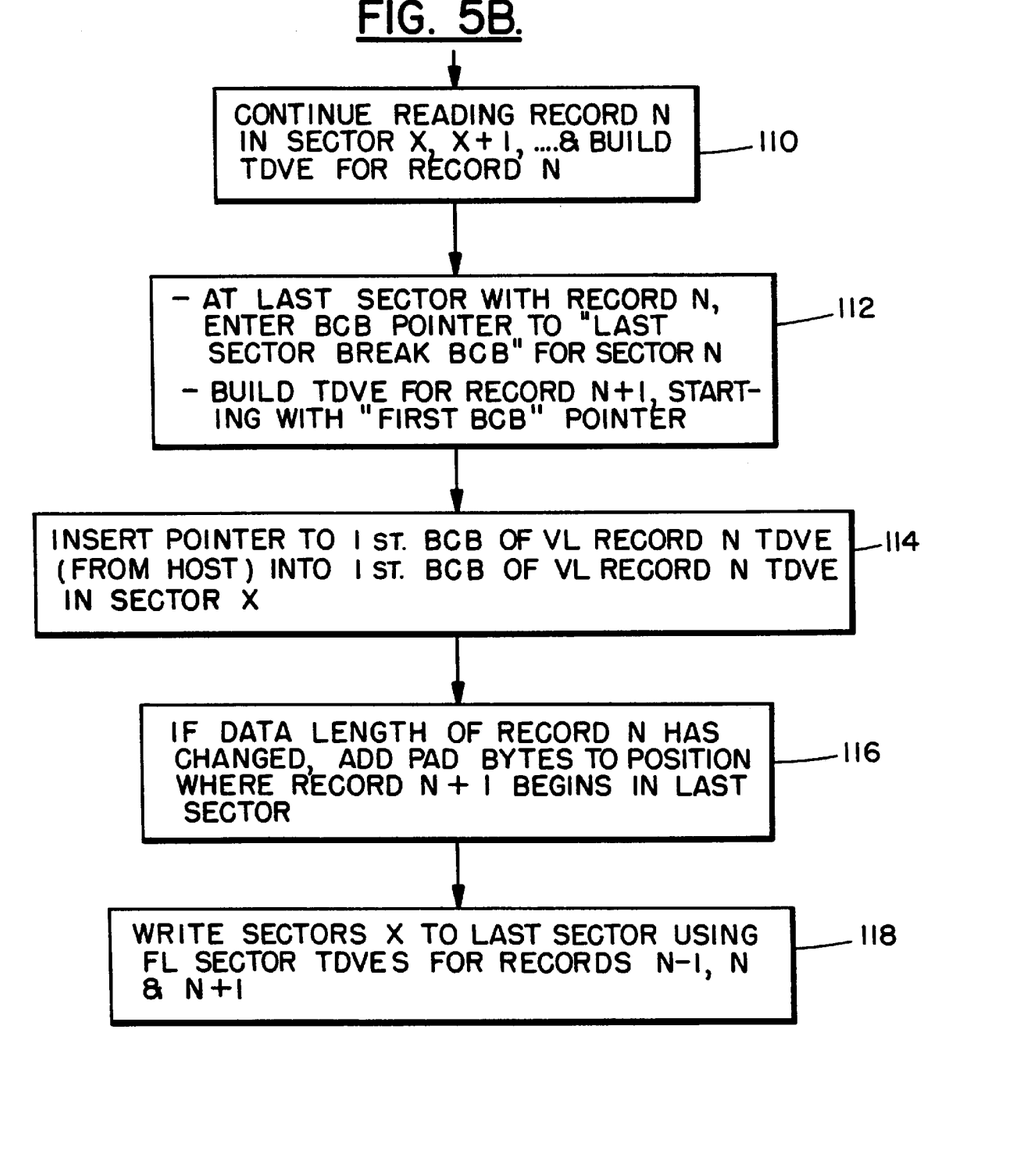

Turning to FIGS. 5A and 5B, a first method for updating a record stored in FL sectors will be described. In this embodiment, the method accesses the FL sectors including the VL record; updates the portion of the VL record; and rewrites the updated VL record back to the same FL sectors. Further, to the extent that pad bytes at the end of a VL record need to be added (or deleted), such actions are accomplished during the rewrite procedure. This first update method is thereby termed the "home area" sector extract and update.

The procedure commences as shown at box 100, wherein a VL record "N" is received from host processor 10 by system interface module 12. System interface module 12 creates a VL record TDVE for VL record N and buffers the count, key and data fields thereof, using chained BCB's (box 102) to record control information which will allow later access thereto. Thereafter, processor 16 (in cache module 14) computes a fixed length sector number (e.g., X) wherein the to-be updated VL record N commences and the number (n) of FL sectors required to store VL record N. Processor 16 is able to compute the position of FL sector X by virtue of having previously created a table which indicates the length of each VL record in the disk track and the number of FL sectors in the track. From this data, the position of the start of VL record N in a FL sector can be readily calculated (box 104).

For purposes of describing the invention, it will be assumed that VL record N both begins and terminates at intermediate points in FL sectors. Given this assumption, processor 16 establishes at least three TDVE entries, one for VL record N−1, one for VL record N and one for VL record N+1. The three TDVE's are required because it is known that the first FL sector in which VL record N is to be found will include the end of VL record N−1. Further, it is also known, given the assumption, that the last FL sector which contains a portion of VL record N also includes an initial portion of VL record N+1 (box 106). All of this information is readily calculated by processor 16, given the known VL record lengths in the track and the number of FL sectors in the track.

Processor 16 next controls a disk controller (e.g. disk controller 18) to read FL sector X (recall that the first portion of VL record N appears in FL sector X). The first data field read from FL sector X is the sector information block (SIB) which is immediately followed by the field descriptor for the end portion of VL record N−1 which is resident in FL sector X. The data from the SIB and count field descriptor is used to build a partial TDVE for the accessed last portion of VL record N−1. A BCB is established which points to the buffer address where the portion of record N−1 that is in FL sector X is buffered. Further, a pointer value to the BCB is inserted into the TDVE as the "last sector break BCB" for VL record N−1 (box 108).

As shown in box 110, reading of FL sector X is continued, thereby accessing the initial portions of VL record N and inserting the relevant data with respect thereto into the TDVE which corresponds to VL record N. As FL sectors X+1, X+2 . . . are read, the necessary data is inserted into the TDVE for VL record N until the FL sector is reached that stores the last portion of VL record N (box 112). The last FL sector is determined from its sector information block (which is sequentially numbered) and enables the number of sectors since the first sector containing VL record N to be determined and correlated with the number of sectors required to store VL record N (determined in box 104).

As with sector X for VL record N−1, a BCB pointer value is entered in the TDVE for record N which enables access to the buffer address where the last portion of record N is stored and was retrieved from the last FL sector. That BCB pointer value is entered into the TDVE as the "last sector break BCB" for VL record N.

Thereafter, data from the latter portion of the last FL sector is used to build TDVE for VL record N+1. More specifically, the buffer area where data is stored from the last sector is indicated (indirectly) by the "first BCB" pointer value inserted in the TDVE as the data is read from the last FL sector.

At this point, a TDVE exists for VL record N as received from host processor 10 (with the update data); and a TDVE exists for VL record N (to-be-updated) as derived from the track just read from disk. All data for the FL sectors comprising record N and portions of record N−1 and record N+1 have been buffered and are indicated by BCB's which are, in turn, noted in the associated TDVE's. The update action is accomplished by changing the pointer value in the TDVE for the VL record N read from disk (hereafter referred to as the updated TDVE), to point to the "first BCB" indicated in the TDVE for VL record N, as received from host processor 10. Thus, when the updated TDVE for record N is employed to re-write data onto the disk track, when the FL sector is reached which stores the first portion of VL record N, the updated TDVE for record N causes the BCB to be accessed which points to buffer address where is stored the update data received from host processor 10 (box 114).

If the length of VL record N changes as a result of the indicated update action and compression thereof, pad bytes are inserted between the new ending of VL record N and the position in the last FL sector where record N+1 begins (box 116). That action is accomplished by inserting into the TDVE for VL record N the number of pad bytes to be inserted at the end of the record to fill out the area of the last FL sector originally occupied by the non-updated version of record N. Thereafter (box 118) the further FL sectors are rewritten to disk, using TDVE's for VL records N−1, N and N+1. More specifically, the TDVE for VL record N−1 causes the data buffered from the end of record N−1 to be accessed via the "last break BCB" and written to disk in FL sector X. Thereafter, the TDVE for VL record N is accessed and controls the writing to disk of buffered information indicated by the BCB's that are found by initially accessing the "first BCB" listed in the TDVE. At the end of VL record N (in the last FL sector), the TDVE for VL record N+1 is accessed and causes the latter portion of the last FL sector to be written with the beginning information from VL record N+1.

Figure 6A:
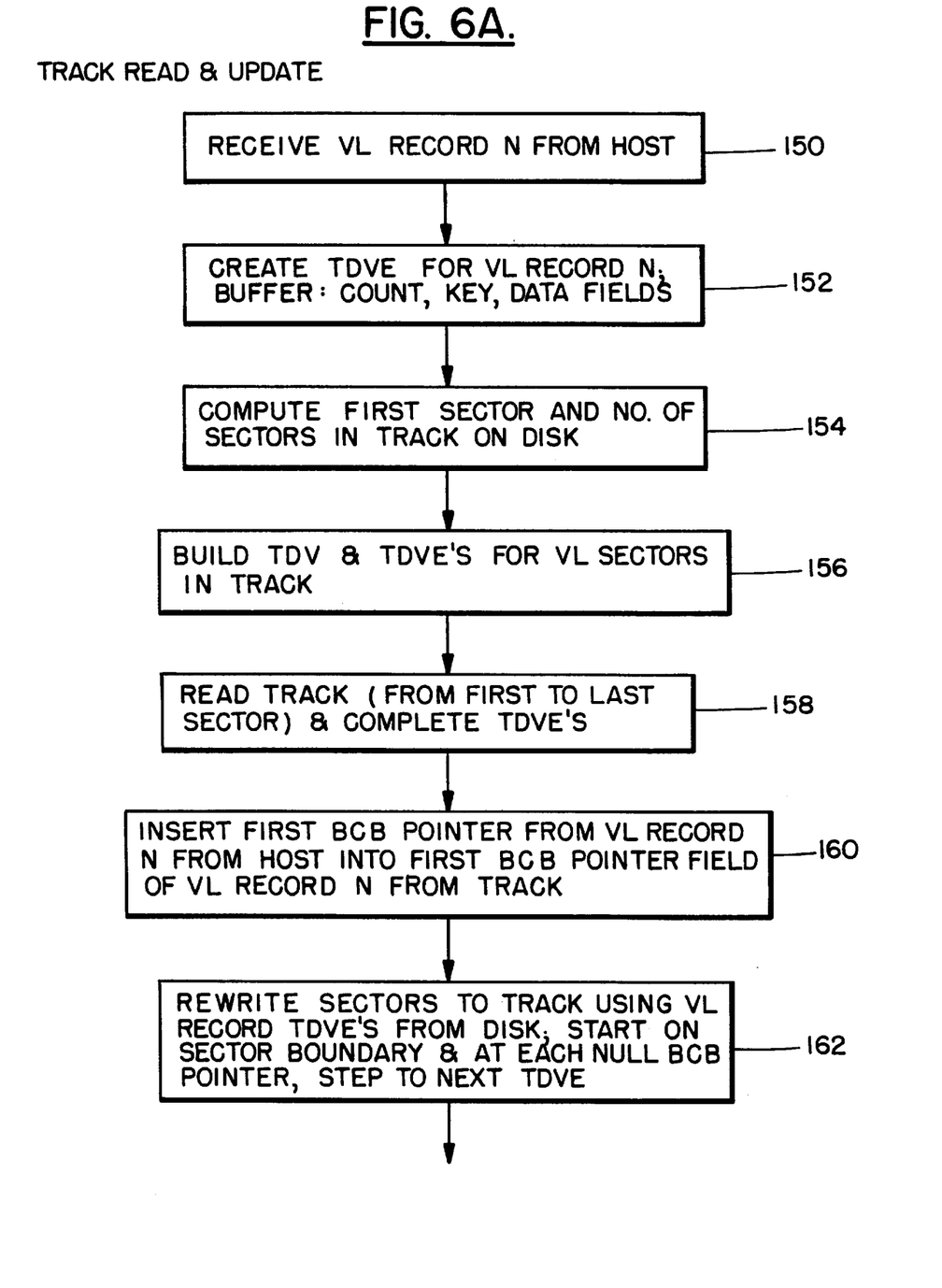
FIGS. 6A and 6B comprise a logic flow diagram illustrating the manner of revision of a fixed length sector/sectors in a disk track in accordance with revision data received from a host processor, wherein the entire track is first accessed, the relevant sector/sectors revised, and the revised data rewritten to disk.
Figure 6B:
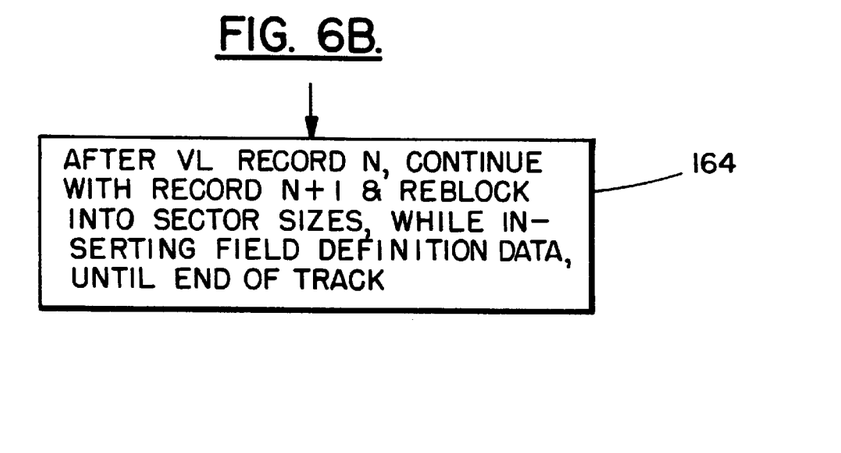

Note that from the above action, no "reblocking" (i.e., rearrangement) of subsequent VL records into FL sectors is required, as they all remain distributed throughout the FL sectors as they were before the update action. However, under certain conditions it is desired to save disk space by compressing all records as they are written to disk, thus avoiding the necessity for insertion of padding therebetween. In such case, the procedure illustrated in FIGS. 6A and 6B is utilized.

Similar to the procedure described in FIGS. 5A and 5B, a VL record N including update data is received from host processor 10 (box 150). System interface module 12 creates a TDVE for the update VL record N and buffers the count, key and data fields (box 152). From a stored track format descriptor which enables a matching of the received VL record N to a particular track, system interface module 12 computes a first FL sector of the track and the number of FL sectors in the track (box 154). Thereafter, a TDV with sufficient TDVE's to encompass all records on the track is established (box 156). Next, the track is read into cache module 14 (from record 0 to the last record on the track) and during the read-in procedure, processor 16 inserts into corresponding TDVE's, data from each FL sector to enable identification of the respectively stored VL records and their re-storage to disk (box 158).

When the read action arrives at the FL sector which includes non-updated VL record N, the corresponding TDVE therefor is filled in with information from the VL record N. However, instead of the "first BCB" entry in the TDVE for VL record N pointing to the BCB for the non-updated data, the "first BCB" from the TDVE for the update VL record N is inserted into the TDVE for the first FL sector which includes VL record N (box 160). The first BCB entry points to the BCB which further defines where the initial portion of updated VL record N is buffered.

After all of the sectors of the accessed track have been read, and the TDVEs for the VL records completed, a write action can proceed wherein each of the FL sectors are re-written destaged to the same track. As shown in box 162, the rewrite of the track commences with FL sector 0 and, using the buffered TDVE data, each sector is rewritten to disk. When the write action arrives at the sector wherein VL record N commences, the associated TDVE causes the recording therein to be in accordance with the BCB data previously entered into the non-updated TDVE from the update VL record N TDVE. Thereafter, succeeding VL records are written into succeeding FL sectors, but are reblocked, starting from the end of updated VL record N (box 164). The reblocking action segments the VL records into FL sectors and inserts the necessary data into the FL sectors' respective SIBs and field descriptors to identify and describe the stored VL records.

Figure 7:
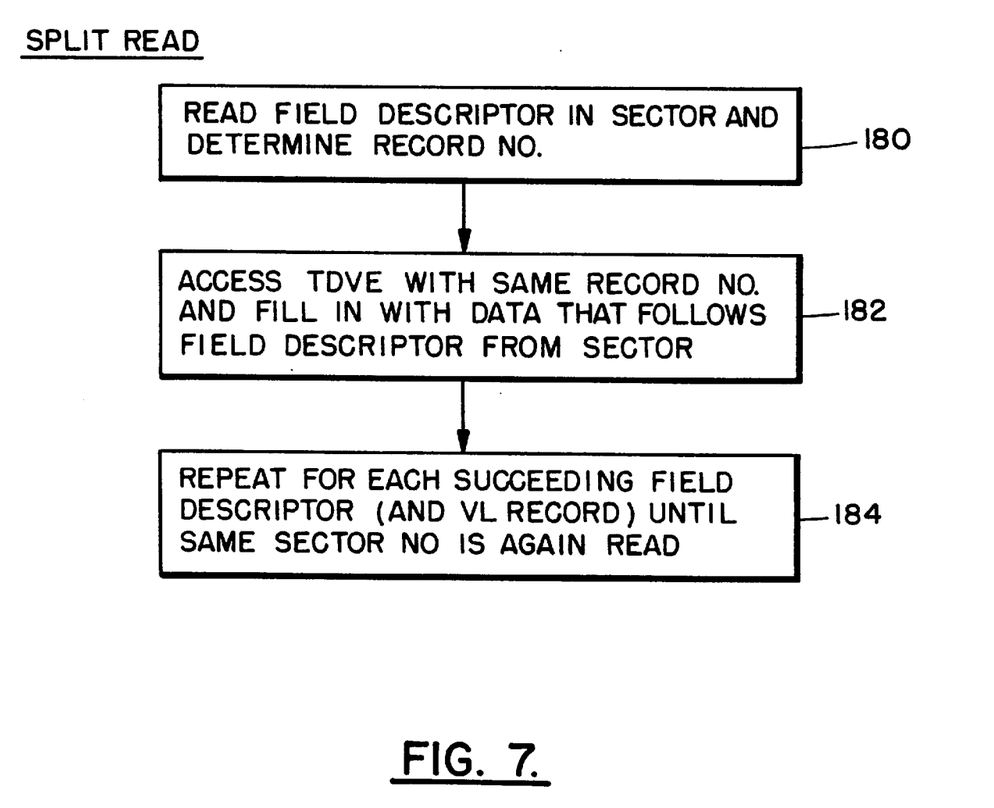
FIG. 7 illustrates a flow diagram wherein a track read operation is enabled from any point on a track, without requiring the read to commence at the beginning of a track.

Turning now to FIG. 7, a "split read" procedure will be described which enables a read action requiring access to multiple FL sectors to commence at any sector and to continue until all FL sectors of interest have been accessed and respective TDVE's for VL records stored therein completed. The field descriptor 1 (FD__1), field descriptor 2 (FD__2), and field descriptor 3 (FD__3), are each provided with a VL record number value which identifies the record which is stored in the FL sector. Further, all SIBs are numbered sequentially. Thus, during a read action, if either an FD__1, FD__2, or FD__3 is accessed, processor 16 immediately knows the VL record with which the incoming data is associated and the FL sector's sequence number. Further, since a TDV has been established with separate TDVE's for each VL record in the track (with each TDVE including a corresponding record no. entry), processor 16 can compare the read record number from a field descriptor and determine to which TDVE the forthcoming data belongs.

Thus, as shown in box 180 in FIG. 7, when a FL sector is read, the field descriptor data is read and the record number is extracted therefrom. Thereafter, the TDVE with the same VL record number entry is determined and the corresponding TDVE is filled in with data that follows the field descriptor (box 182). Thereafter (box 184), the procedure is repeated for each field descriptor until the TDVE for the VL record that was initially sensed in box 180 is completed (i.e., when the track has rotated 360°). At such point, the entire TDV for the track looks identical to the way it would have looked had the sector read operation commenced at the beginning of a first FL sector including the VL record. At such time, the track read action is complete and an update can occur.

More precisely, when a FL sector including a split VL record arrives, the FL sector information is processed, field descriptor by field descriptor until a field descriptor is reached with a "continuation of field" indicator set to 0. This is a flag which is established to mark fields following an initial field descriptor associated with a record. Essentially, this flag indicates a "start of record in TDVE". This flag causes an access of the TDVE specified by the record number in the field descriptor and causes a copy to be made of the first BCB pointer from the TDVE. This sector and subsequent ones are processed as normal. When the last sector has been processed, a copy of the first BCB is stored into the "last BCB" entry in the chain of BCB's for the TDVE. This completes the entire BCB chain for the record.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for enabling a host processor which employs variable length (VL) records to communicate with disk storage means which employs fixed length (FL) sectors for storage of said VL records, said method comprising the steps of:
   a) deriving a first control data structure for an update VL record, said first control data structure including information describing segments of said update VL record;
   b) determining a disk track that includes a FL sector wherein an old VL record commences that corresponds to said update VL record;
   c) reading each FL sector in said disk track and creating a control data structure which includes information describing each VL record stored in said disk track;
   d) substituting in a control data structure for said old VL record that corresponds to said update VL record, information regarding update data from said first control data structure; and
   e) recording in said disk track, data indicated by each control data structure determined in steps c) and d).

2. The method as recited in claim 1, further comprising the steps of:
   f) if said old VL record ends at other than a sector break of a FL sector, reblocking VL records into FL sectors which are recorded thereafter on said disk track.

3. The method as recited in claim 2, wherein said reblocking involves a segmenting of each VL record into one or more FL sectors, each FL sector further including additional data which describes VL record data stored therein.

4. The method as recited in claim 1, wherein step d) inserts pointer data to one or more additional control data structures which define buffer storage areas where data from said update VL record is stored, said pointer data being the information regarding update data from said first control data structure.

5. A memory media for enabling a host processor which employs variable length (VL) records to communicate with disk storage means which employs fixed length (FL) sectors for storage of said VL records, said memory media comprising:
   a) means for controlling a processor to derive a first control data structure for an update VL record, said first control data structure including information describing segments of said update VL record;
   b) means for enabling a disk controller to determine a disk track that includes a FL sector wherein am old VL record commences that corresponds to said update VL record;
   c) means for enabling a disk drive coupled to said disk controller to read each FL sector in said disk track and to enable said processor to create a control data structure which includes information describing each VL record stored in said disk track;
   d) means for causing said processor to substitute in a control data structure for said old VL record that corresponds to said update VL record, information regarding update data from said first control data structure; and
   e) means for controlling said disk controller and said disk drive to record in said disk track, data indicated by each control data structure determined by said means c) and d).

6. The memory media as recited in claim 5, further comprising:
   f) means responsive to said old VL record ending at other than a sector break of a FL sector, to cause said processor to reblock VL records into FL sectors which are recorded thereafter on said disk track.

7. The memory media as recited in claim 6, wherein said reblocking involves a segmenting of each VL record into one or more FL sectors, each FL sector further including additional data which describes VL record data stored therein.

8. The memory media recited in claim 5, wherein means d) causes said processor to insert pointer data to one or more additional control data structures which define buffer storage areas where data from said update VL record is stored, said pointer data being the information regarding update data from said first control data structure.

9. A method for enabling a reading of a variable length (VL) record that is stored in multiple fixed length (FL) sectors on a disk drive, to commence at any FL sector which includes a portion of said Vl record, said method comprising the steps of:
   (a) including in each said multiple FL sectors, field descriptors which describe each portion of a VL record that is stored therein;
   (b) deriving a control data block for at least one said VL record;
   (c) commencing to read FL sectors from said disk drive at a FL sector that includes an intermediate field descriptor other than a first field descriptor which occurs at a beginning of a VL record, and employing information from said intermediate field descriptor to identify a corresponding control data block; and
   (d) later, during a rotation of said disk drive, employing information from one or more FL sectors to enter data into said corresponding control data block, up to and including a FL sector which includes said intermediate field descriptor.

10. The method as recited in claim 9, wherein step (c) further causes a control indication to be generated when it is determined that a FL sector with an intermediate field descriptor of a VL record to be accessed, is being read, said control indication enabling operation of step (d).

* * * * *